United States Patent [19]
Weisburn et al.

[11] Patent Number: 5,695,054
[45] Date of Patent: Dec. 9, 1997

[54] CARRYING CASE FOR RECORDED MEDIA

[75] Inventors: James T. Weisburn, Massillon; Ronald M. Marsilio, Mogadore, both of Ohio

[73] Assignee: Fellowes Manufacturing Company, Itasca, Ill.

[21] Appl. No.: 640,499

[22] Filed: May 1, 1996

[51] Int. Cl.⁶ ............................................ B65D 85/30
[52] U.S. Cl. .................. 206/308.1; 206/311; 206/308.3
[58] Field of Search .......................... 206/307, 425, 206/311, 308.1, 309, 310, 308.3

[56] References Cited

U.S. PATENT DOCUMENTS

| | | |
|---|---|---|
| 3,323,243 | 6/1967 | Blair . |
| 3,374,794 | 3/1968 | Reed . |
| 3,446,360 | 5/1969 | Gutierrez . |
| 4,047,315 | 9/1977 | Osher . |
| 4,535,888 | 8/1985 | Nusselder . |
| 4,538,730 | 9/1985 | Wu . |
| 4,676,375 | 6/1987 | Willems et al. . |
| 4,778,047 | 10/1988 | Lay . |
| 4,844,260 | 7/1989 | Jaw . |
| 5,022,516 | 6/1991 | Urban et al. . |
| 5,027,950 | 7/1991 | Gutierrez et al. . |
| 5,099,995 | 3/1992 | Karakane et al. . |
| 5,176,250 | 1/1993 | Cheng . |
| 5,180,058 | 1/1993 | Hu . |
| 5,201,414 | 4/1993 | Kaszubindki . |
| 5,246,107 | 9/1993 | Long et al. . |
| 5,307,926 | 5/1994 | Mee ............................. 206/311 |
| 5,322,162 | 6/1994 | Melk . |
| 5,341,926 | 8/1994 | Leben .......................... 206/307 |
| 5,370,224 | 12/1994 | Karakane et al. . |
| 5,529,182 | 6/1996 | Anderson et al. .......... 206/310 |
| 5,531,321 | 7/1996 | O'Brien et al. ............. 206/309 |

*Primary Examiner*—Paul T. Sewell
*Assistant Examiner*—Nhan T. Lam
*Attorney, Agent, or Firm*—Brinks Hofer Gilson & Lione

[57] ABSTRACT

A carrying case for recorded media such as compact discs and 3½ inch floppy diskettes and the associated printed graphics. The case includes a base hingedly connected to a lid by a hinge panel. A plurality of hinge pages are pivotally joined together by a hinge assembly and mounted on the hinge panel. The hinge pages hold a compact disc on one side and have a removable cover page mounted on an opposite side to form a multi-media page. The cover page enables the multi-media pages to hold either an additional compact disc or a 3½ inch floppy diskette, and forms an intervening pocket for holding graphics. A pair of pivot arms extend from each hinge page and a housing is formed on a free end of each arm. The multi-media pages are stacked on top of one another and the arm housings of the hinge pages interlock to form the hinge assembly. The multi-media pages are pivoted by the hinge assembly and the manual pivotal movement of one multi-media page toward a horizontal position causes the adjacent housings to interact moving the adjacent multi-media page to a substantially vertical position for ease of removal and insertion of the recorded media and graphics.

17 Claims, 12 Drawing Sheets

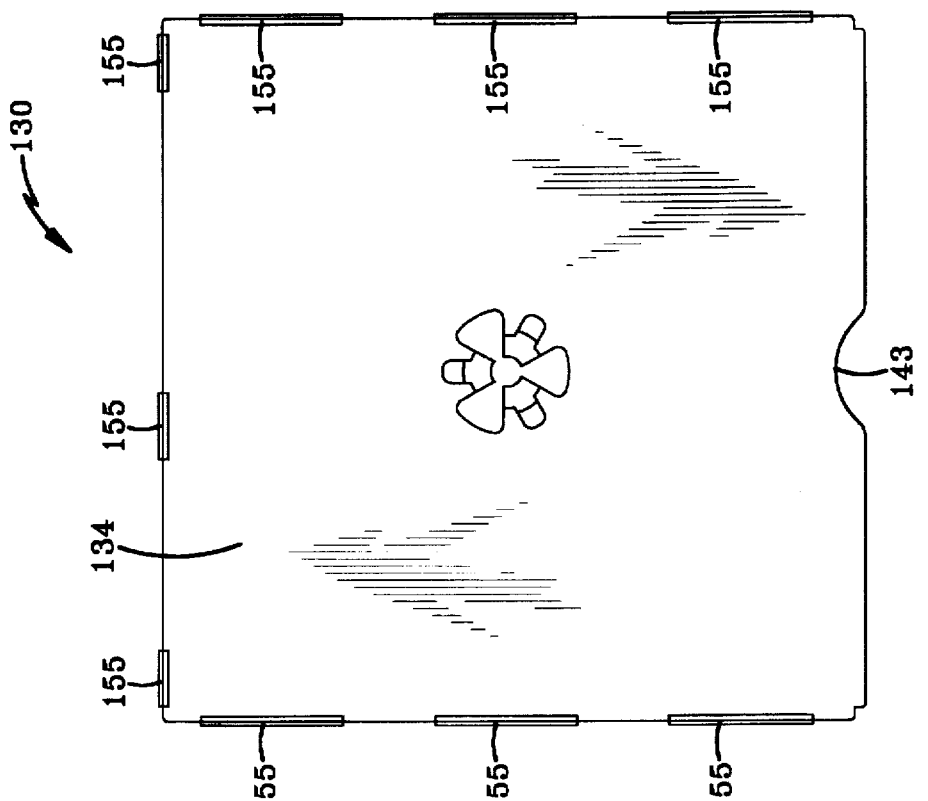
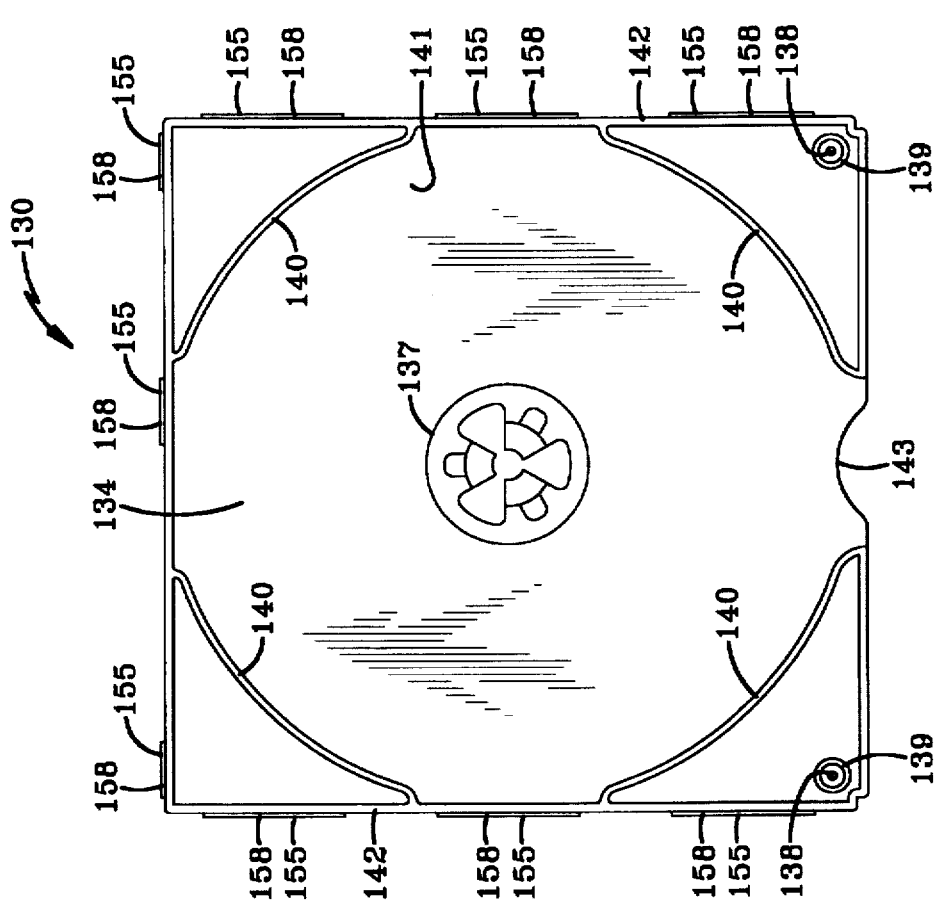

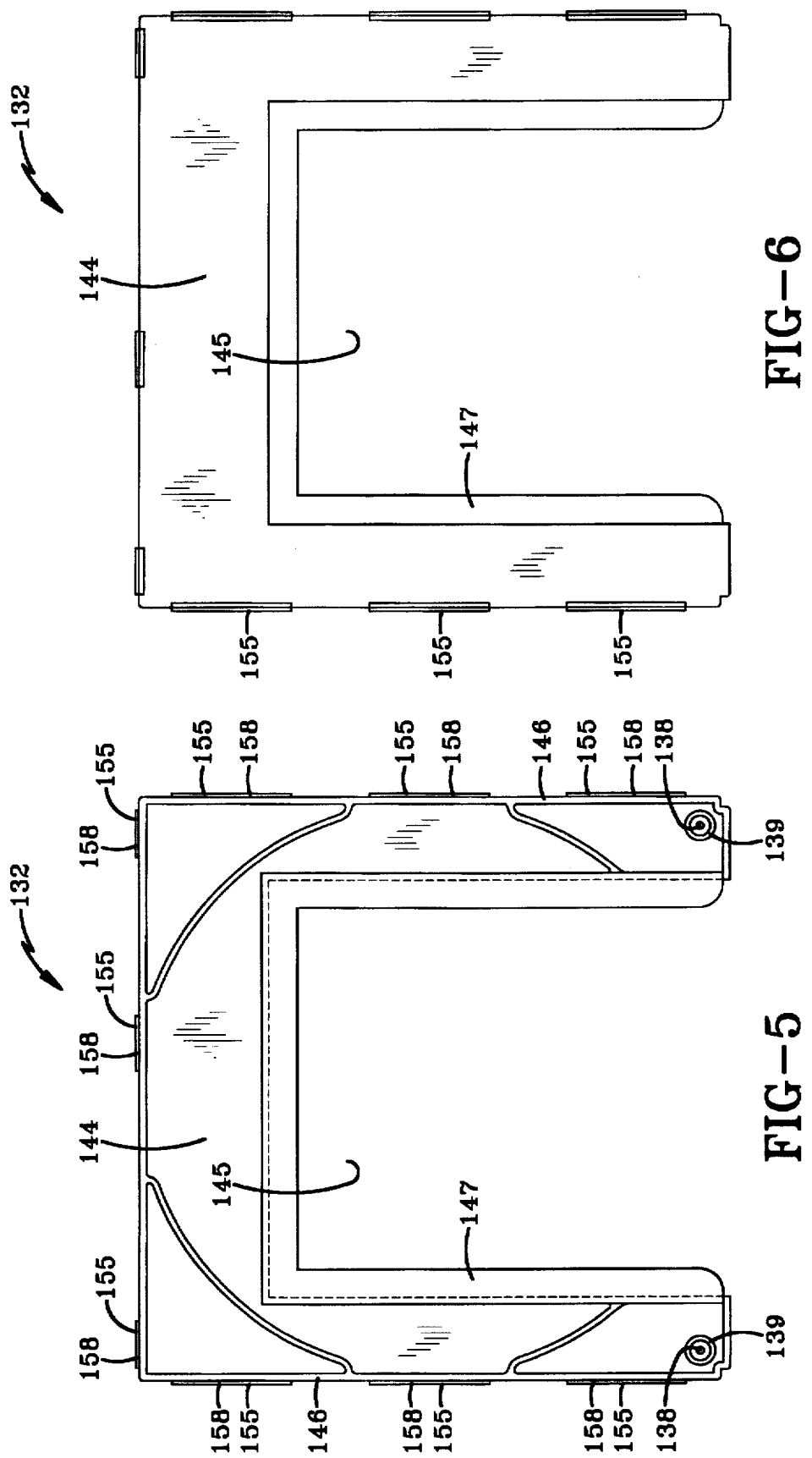

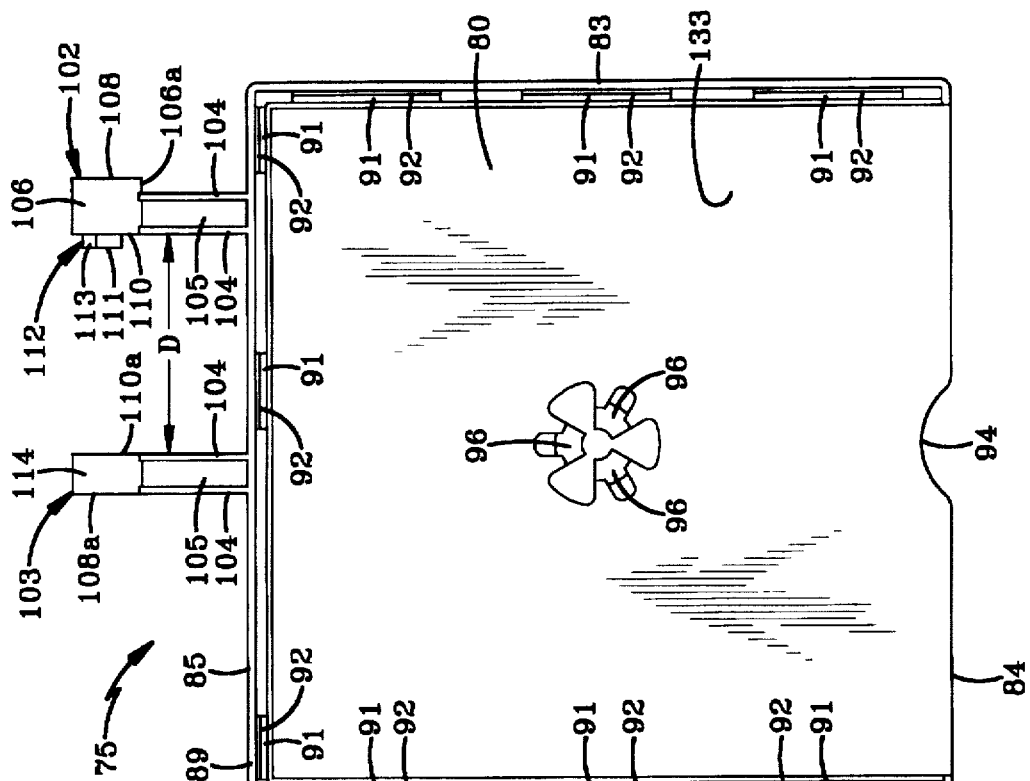
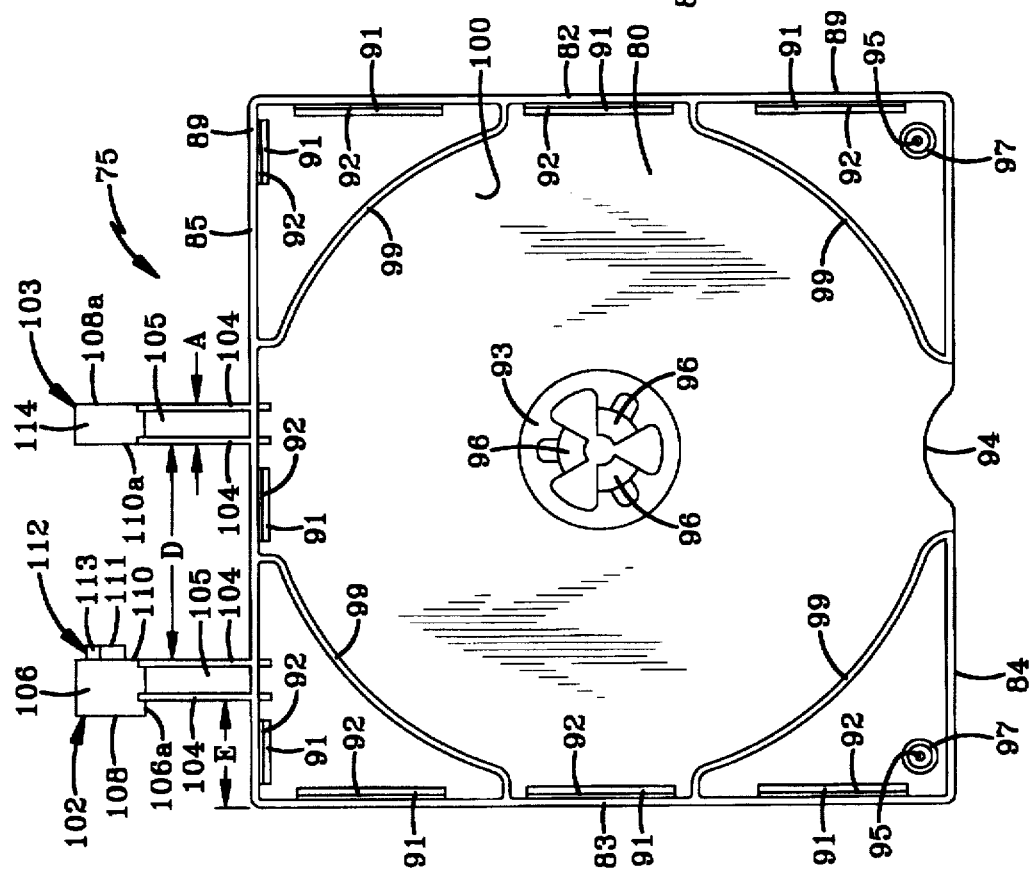

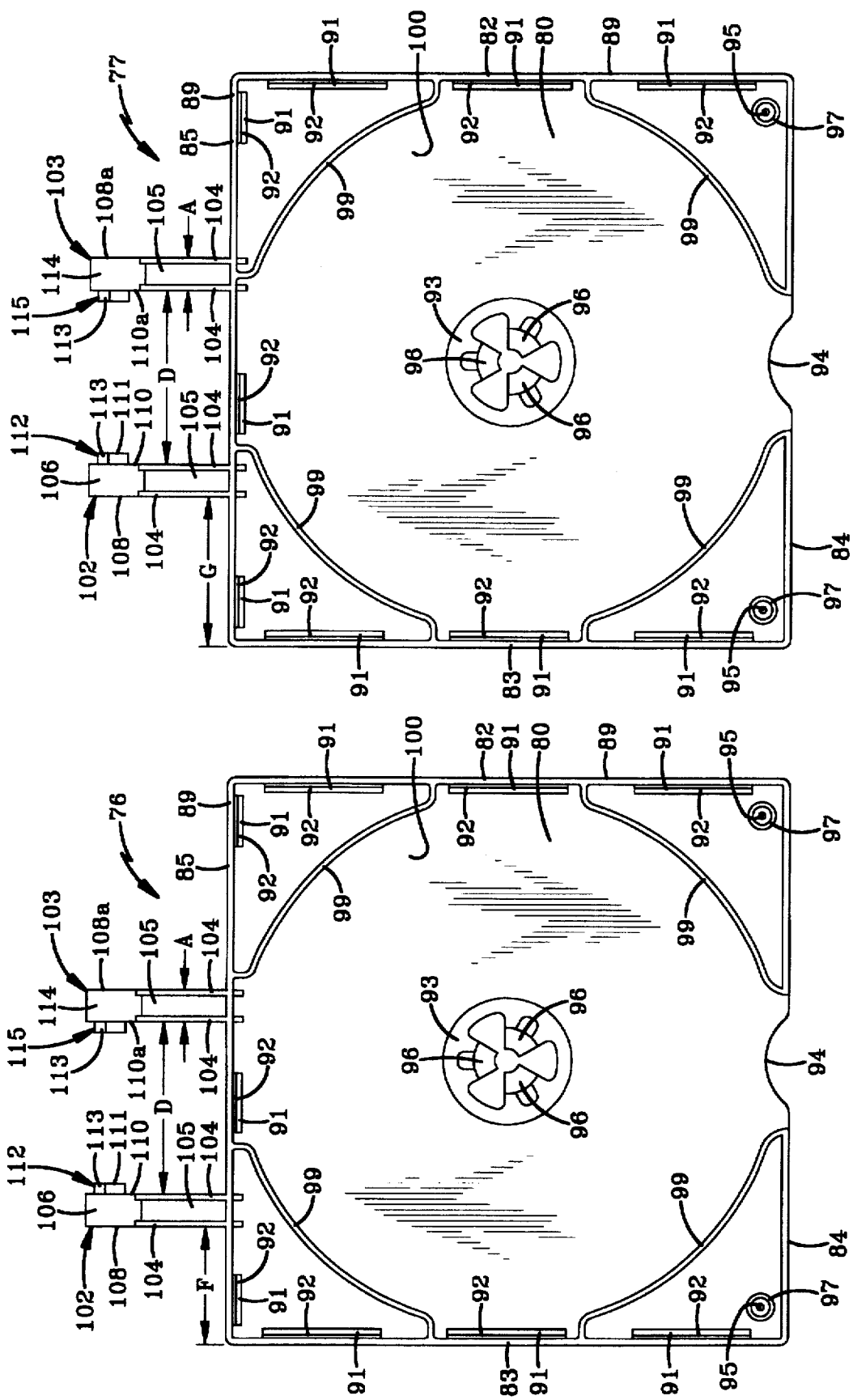

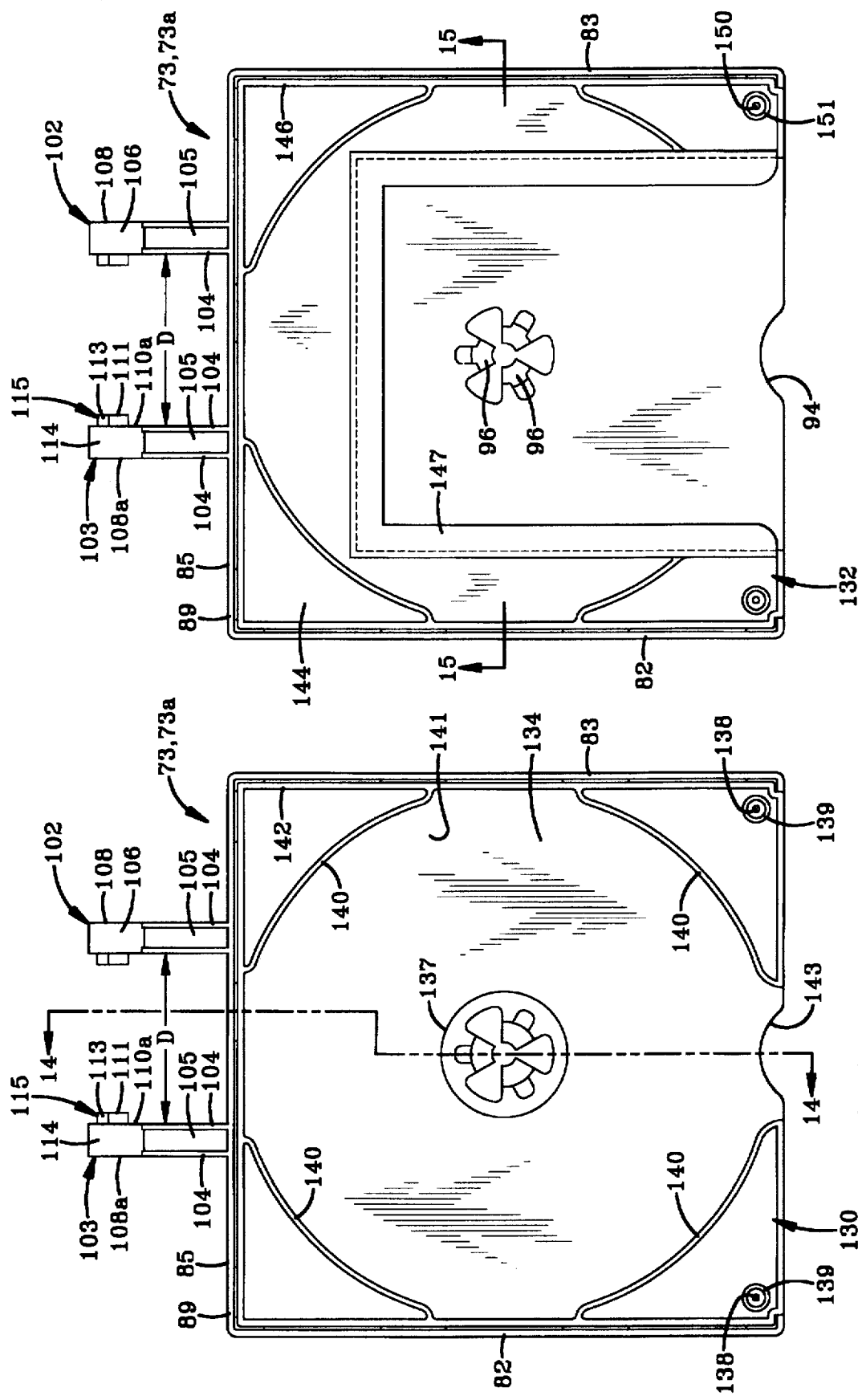

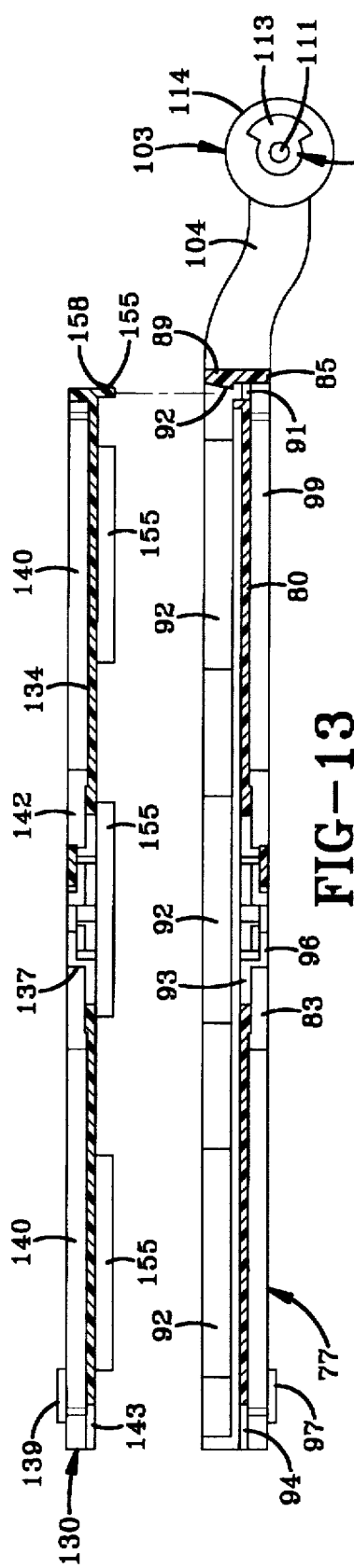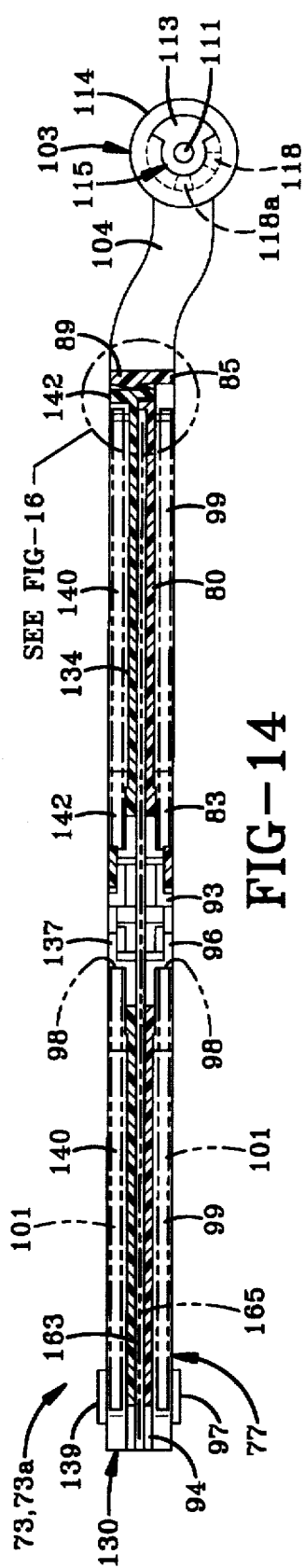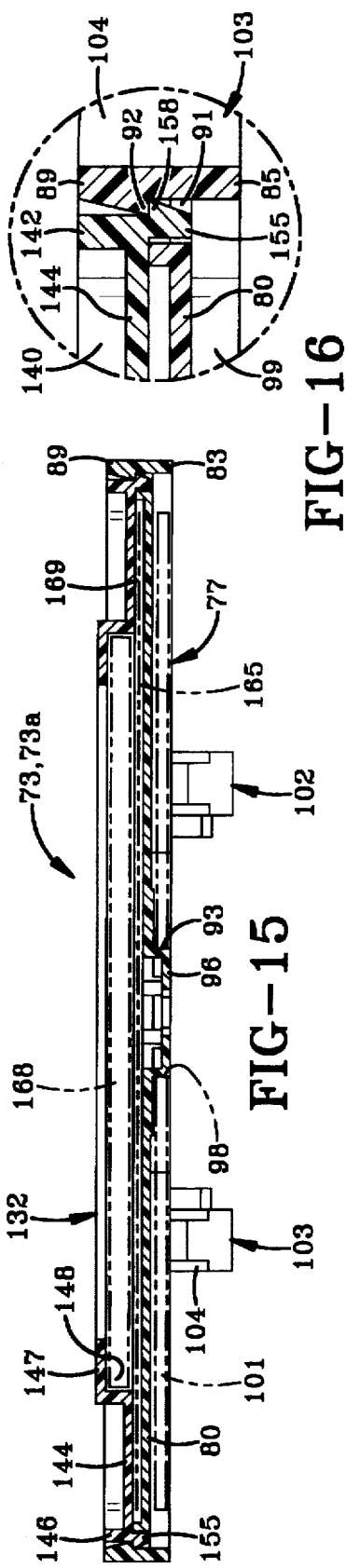

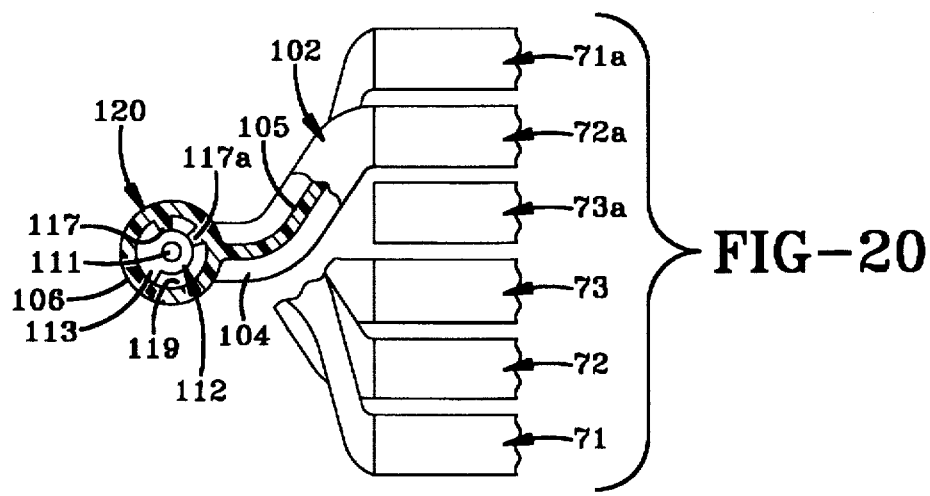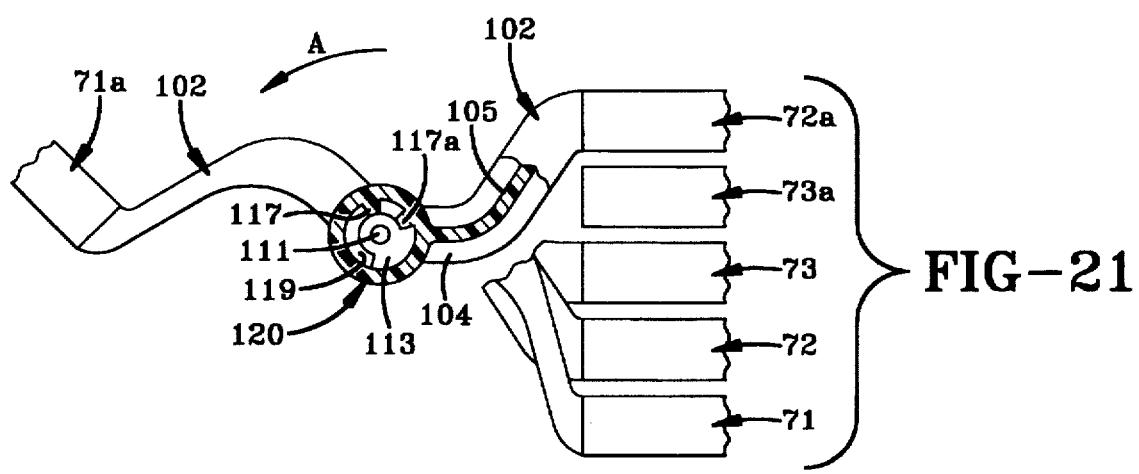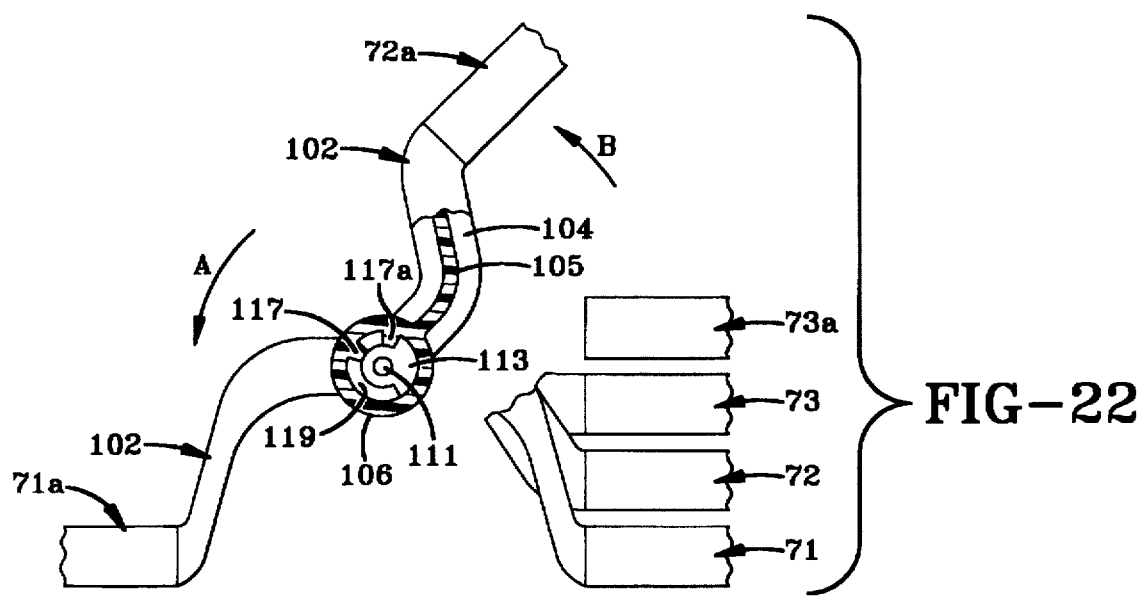

CARRYING CASE FOR RECORDED MEDIA

BACKGROUND OF THE INVENTION

1. Technical Field

The invention relates to a carrying case. More particularly, the invention relates to a carrying case for storing and carrying recorded media such as compact discs, 3½ inch floppy disks and their associated graphics. Even more particularly, the invention relates to a carrying case which uses a plurality of hingedly connected multi-media pages to hold the recorded media and allows a user to peruse the recorded media by flipping through the multi-media pages.

2. Background Information

Personal computers have become a part of everyday life for many people. These personal computers require instructions from recorded software programs which instruct the computer to perform a given function. The recorded software is available in a variety of mediums including 3½ inch software diskettes and compact discs (CD) which can be of the CD audio or CD ROM type. Software diskettes are well known in the computer art and 3½ inch interface ports are standard equipment supplied with many personal computers. CD ROM discs are a relatively new form of recording media which are growing in popularity with increasing sales of CD ROM players for data input and of compact disc players for audio.

Floppy diskettes are packaged and sold in a cardboard box usually with 10 diskettes per box. These boxes deteriorate over time requiring users to purchase a new storage case to hold their diskettes and protect the diskettes from dust, debris or damage.

Most CDs are packaged and sold in a polystyrene transparent plastic case, commonly referred to as a "jewel box". These jewel boxes are brittle and break easily when dropped on a hard surface or when mishandled. Once broken, these jewel boxes are incapable of adequately protecting the enclosed CD, and thus the CD will be exposed to dust, debris or damage. Also, the CD is relatively small in size when compared to the jewel box and a much larger storage case is necessary to store a collection of CDs and jewel boxes than if the CDs were stored without their jewel boxes.

Many prior art storage cases to store recorded media have been developed, such as shown in U.S. Pat. No. 5,370,224. The disc holder includes a base member with an engagement portion, and a flexible sheet. The base member and the flexible sheet form a pocket for holding a compact disc. A housing case body comprises a housing member which houses the disc holder and a mounting member which is engaged by the disc holder. A disc housing case combines the disc holder and the housing case body.

U.S. Pat. No. 5,246,107 discloses another compact disc storage unit with a plurality of disc receiving plates, each of which supports one compact disc. The plates are alternatively hinged to one another in an accordion type manner which causes the plates to precess with a "flipping" motion to conveniently present the discs to the user for viewing and removal.

U.S. Pat. No. 5,180,058 discloses an expandable disc holder assembly which includes front and back cartridges and one or more intermediate cartridges detachably and pivotally secured to the front and back cartridges or to each other. The intermediate cartridges are adaptable to hold either a CD or floppy diskette.

U.S. Pat. No. 5,176,250 discloses a disk storage box which includes two pivoted shells connected by two axle caps with a hollow shaft retained therebetween to hold a plurality of flat disk holders. Lifting one shell from the other causes the axle caps to rotate the hollow shaft, permitting the flat disk holders to be spread out like a fan. Stop strips are made in connecting rings on one shell to confine the axle cap to be rotated within a fixed angle.

U.S. Pat. No. 5,027,950 discloses a support and display assembly for holding a plurality of thin lightweight objects and includes a support frame with a plurality of parallel holder structures rotatably mounted therein and pivotal between two oppositely disposed angularly oriented positions. Movement of one of the holders will move the adjacent holder into an easy viewing position.

U.S. Pat. No. 5,022,516 discloses a storage container for flat recording media comprising a lid pivotally connected to a bottom and a pocket turnably coupled to the lid so that the pocket can be swiveled into or out of a substantially parallel position with respect to the lid. An arcuate edge having an elongate guide element is formed laterally on the pocket to guide the lid and open the pocket during swiveling.

U.S. Pat. No. 4,844,260 discloses a computer disc packing box with two pivotally jointed seats, a plurality of disc storage bags, upper and lower covers and two cover plates. Grooves are formed on the inner sides of the two opposite pivotally-jointed seats and inserting legs on the two sides of the bottom edge of the disc storage bags are inserted therein for pivotal movement.

U.S. Pat. No. 4,538,730 discloses a collapsible storage box for floppy disks which includes a casing containing a plurality of bags for storing the disks.

Further examples of cases for storing recorded media are shown in U.S. Pat. Nos. 5,201,414, 5,009,995, 4,778,047, 4,535,888, 4,047,315, 3,446,360, 3,374,794, 3,323,243.

Although these prior art storage cases are adequate for the purpose for which they are intended, they fail to provide a case with a plurality of easily molded hinge pages to store a compact disc and associated graphics, and capable of receiving a removable cover page to form a multi-media page and enable the multi-media page to store an additional compact disc or a 3½ inch floppy disk, and in which the multi-media pages are hingedly connected with a hinge assembly to allow the multi-media pages to pivot between a plurality of different positions for ease of viewing and gaining access to the stored media.

Therefore, the need exists for a carrying case for recorded media which includes a plurality of hinge pages for storing a plurality of compact discs, which pages can be snap-fitted with various cover pages to store either an additional compact disc or a 3½ inch floppy disks and to form multi-media pages, which is formed with a pocket for receiving and storing associated graphics, and which includes a hinge assembly which moves one multi-media page to an angular position when the previous multi-media page is moved to a horizontal position to present the compact disc and/or floppy disk for ease of removal from the multi-media page. There is no such carrying case of which we are aware that accomplishes these results.

SUMMARY OF THE INVENTION

Objectives of the invention include providing an improved carrying case for recorded media which is relatively compact in size and which can be mass produced relatively inexpensively from a lightweight molded plastic material.

A further objective is to provide such a carrying case which has a plurality of hinge pages which are formed to store a simple compact disc thereon and which can have various cover pages which snap-fit thereon to form multi-media pages and enable the multi-media pages to store either an additional compact disc or a 3½ inch floppy disk, and store associated graphics in a pocket formed in each of the multi-media pages.

A still further objective is to provide such a case in which the multi-media pages are hingedly connected to a hinge panel and form a hinge assembly to allow the multi-media pages to pivot between a plurality of positions to provide for easy viewing of the media stored therein and to facilitate removal and insertion of a selected disc or graphics.

Another objective is to provide such a case in which the multi-media pages pivot to an angularly vertically extending position which allows for easy viewing and removal of the compact disc or floppy diskette held thereon, when the previous multi-media page is pivoted to one of the horizontal positions.

These objectives and advantages are obtained by the carrying case for recorded media of the present invention the general nature of which may be stated as including a base hingedly connected to a lid by a hinge panel for movement between open and closed positions; a plurality of pages; a hinge assembly for movably mounting the pages on the hinge panel; a hub formed on a first side of each of the pages for supporting a first recorded medium on said pages; an attachment member mounted on a second side of each of the pages for storing a second recorded medium on said pages; and a storage compartment formed between each page and its respective attachment member for storing the graphics therein.

BRIEF DESCRIPTION OF THE DRAWINGS

The preferred embodiments of the invention, illustrative of the best modes in which applicants have contemplated applying the principles, are set forth in the following description and are shown in the drawings and are particularly and distinctly pointed out and set forth in the appended claims.

FIG. 3 is a plan view of the outer or disc storage side of a compact disc cover page;

FIG. 4 is a plan view of the inner surface of the compact disc cover page of FIG. 3;

FIG. 5 is a plan view of the outer surface of a 3½ inch floppy diskette cover page;

FIG. 6 is a plan view of the inner side of the 3½ inch floppy diskette cover page of FIG. 5;

FIG. 7 is a plan view of the outer or disc storage side of a first hinge page;

FIG. 8 is a plan view of the inner side of the first hinge page of FIG. 7;

FIG. 9 is a plan view of the outer or disc storage side of a second hinge page;

FIG. 10 is a plan view of the outer or disc storage side of a third hinge page;

FIG. 11 is a plan view of the third hinge page of FIG. 10 with the compact disc cover page of FIGS. 3 and 4 attached thereto to form a multi-media page;

FIG. 12 is a plan view of the third hinge page of FIG. 10 with the 3½ inch floppy diskette cover page of FIGS. 5 and 6 attached thereto to form a multi-media page;

FIG. 13 is an exploded sectional view of the multi-media page of FIG. 11;

FIG. 14 is a sectional view taken along line 14—14, FIG. 11, with two compact discs and graphics, shown in dot-dash lines, retained by the multi-media page;

FIG. 15 is a sectional view taken along line 15—15, FIG. 12, with a compact disc, a 3½ inch floppy diskette and graphics, shown in dot-dash lines, retained by the multi-media page;

FIG. 16 is a greatly enlarged fragmentary sectional view of the encircled portion of FIG. 14;

FIG. 20 is a greatly enlarged fragmentary sectional view of the hinge assembly with part of the second multi-media page shown in section;

FIG. 21 is a greatly enlarged fragmentary sectional view similar to FIG. 20 showing the pivotal movement of the first multi-media page;

FIG. 22 is a greatly enlarged fragmentary sectional view similar to FIG. 21 showing the pivotal movement of the second multi-media page upon the first multi-media page being moved to a horizontal position;

Similar numbers refer to similar parts throughout the drawings.

DESCRIPTION OF THE PREFERRED EMBODIMENTS

Figure 1:
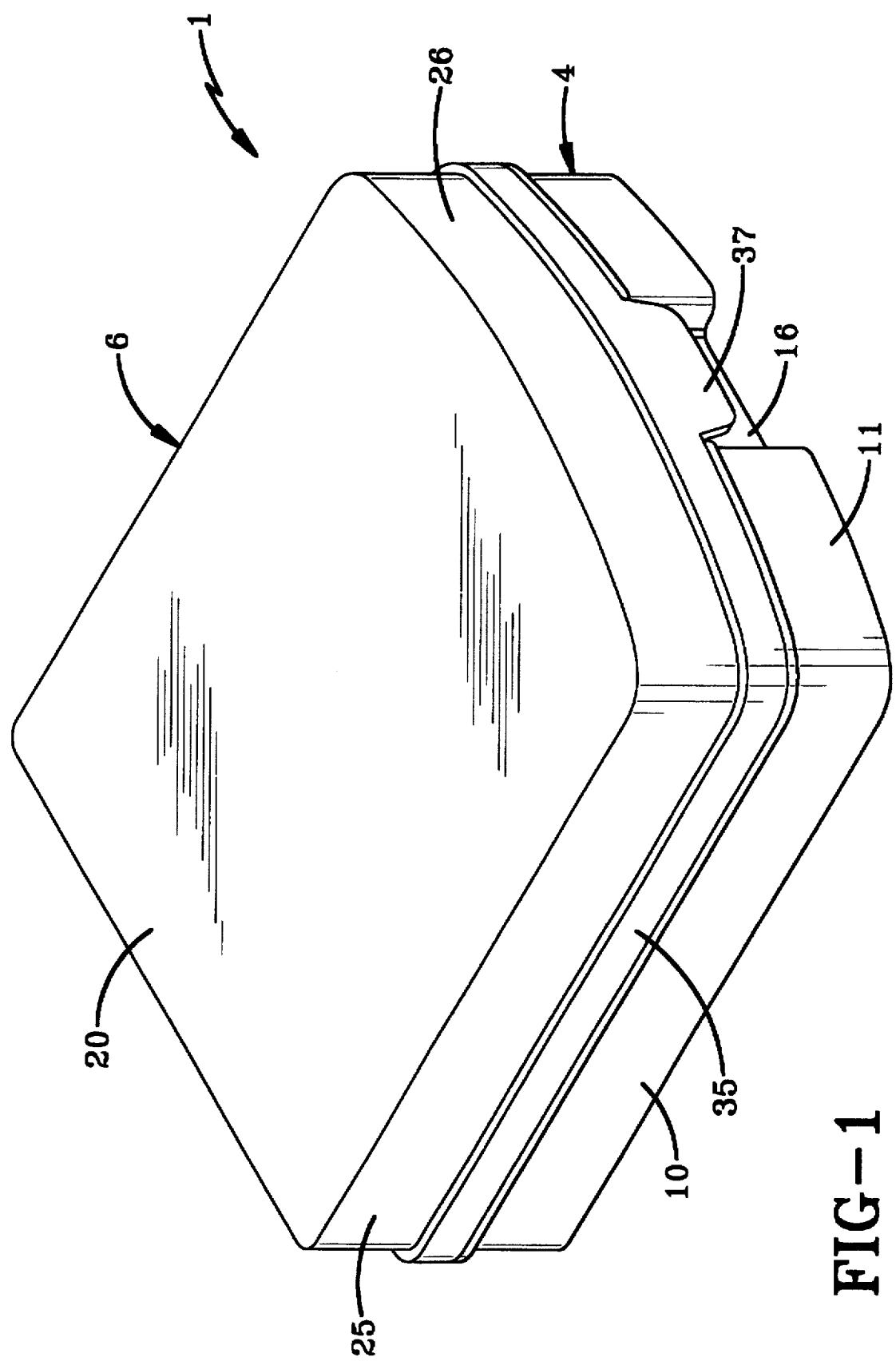
FIG. 1 is a perspective view of the carrying case of the present invention shown in a closed position.

A first embodiment of the carrying case of the present invention is shown in FIG. 1, and is indicated generally at 1. Case 1 is molded preferably of a plastic material, such as polypropylene and includes a base 4 and a closure lid 6. Base 4 has a four-sided rectangular-shaped flat bottom wall 8 (FIG. 2) with upstanding spaced parallel side walls 9 and 10, and upstanding spaced parallel front and rear walls 11 and 12, respectively.

Rear wall 12 includes two upstanding rectangular end sections 13 and an intervening half wall section 15. Walls 9–12 are formed integrally with bottom wall 8 and are arranged in a rectangular-shaped configuration to enclose all four sides of bottom wall 8. A peripheral flange 17 extends outwardly from walls 9–11 adjacent an upwardly extending top edge 18 of walls 9–11, and further extends around a small portion of rear wall 12. Front wall 11 has an inwardly indented portion 16 formed in the center of wall 11 below top edge 18.

Closure lid 6 has a four-sided top closure wall 20, generally similar in size and configuration to bottom wall 8 of base 4. Lid 6 includes upstanding parallel side walls 24 and 25, and upstanding parallel front and rear walls 26 and 27, respectively. Rear wall 27 includes two upstanding rectangular end sections 28 and an intervening half wall section 30. Walls 24–27 are formed integrally with closure wall 20 and are arranged in a rectangular-shaped configuration to enclose all four sides of wall 20. A peripheral edge 35 of lid 6 is formed integrally with lid walls 24–26 and extends around a small portion of rear wall 27. Lid walls 24, 25 and 26 terminate in stepped shoulders 24a, 25a and 26a (FIGS. 2 and 23), respectively, which receive top edge 18 of base 4 when case 1 is in a closed position (FIG. 1) to provide a relatively dust free seal therebetween.

A latching flange 37 extends outwardly from the center of front wall 26 of lid 6 and has a generally truncated configuration with a pair of tapered sides 39. A tab 38 extends outwardly from flange 37 and catches under edge 18 of front wall 11 of base 4 to latch lid 6 when in the closed position as shown in FIG. 1.

Figure 2:
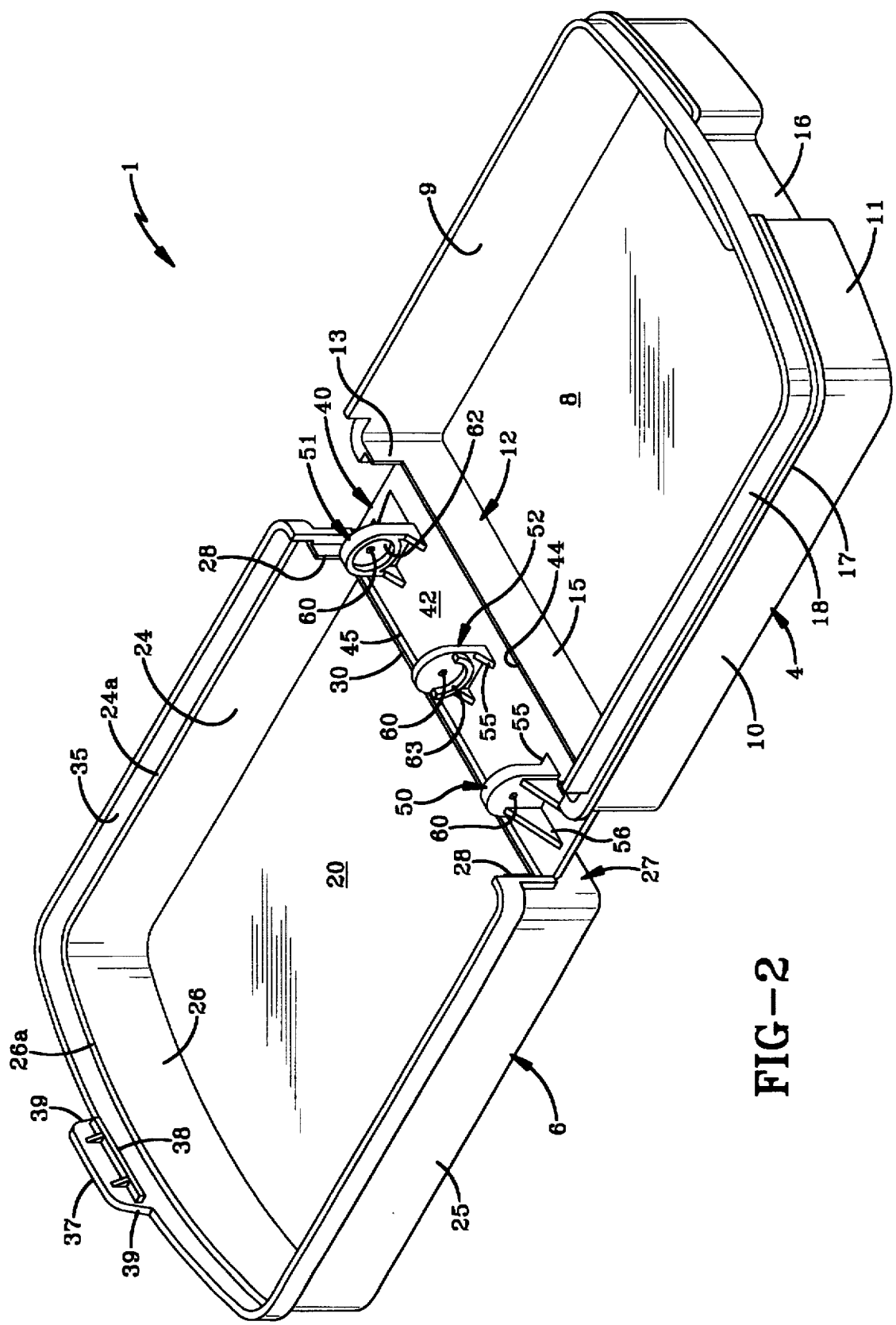
FIG. 2 is a perspective view of the case of FIG. 1 shown in a full open position with the multi-media pages removed therefrom.

Lid 6 is hinged movably mounted on base 4 by a double hinge panel, indicated generally at 40 (FIG. 2). Hinged panel 40 includes an elongated rectangular-shaped panel 42 which is pivotally connected between the top edges of half walls 15 and 30 by reduced thickness living hinges 44 and 45, respectively. Hinge panel 40 allows base 2 and lid 6 to move between the open position of FIG. 2 and the closed position of FIG. 1.

A pair of ear-shaped end lugs 50 and 51 are formed integrally with and extend orthogonally from an inside surface of hinge panel 42. Each lug 50 and 51 is positioned adjacent an outer edge of hinge panel 42 and a middle ear shaped lug 52, similar in size and shape to lugs 50 and 51, is positioned midway between lugs 50 and 51. Lugs 50–52 are reinforced on one side by a plurality of triangular-shaped flanges 55, and lugs 50 and 51 are reinforced on the other side by larger triangular-shaped flanges 56. A hole 60 is formed in the center of each lugs 50–52 for receiving a rod 65, shown in dot dash lines in FIG. 23 and as described below in further detail. A circular counter bore 62 is formed in an inside surface of lugs 50 and 51 and a curved support flange 63 extends from at least one side of lug 52.

Figure 17:
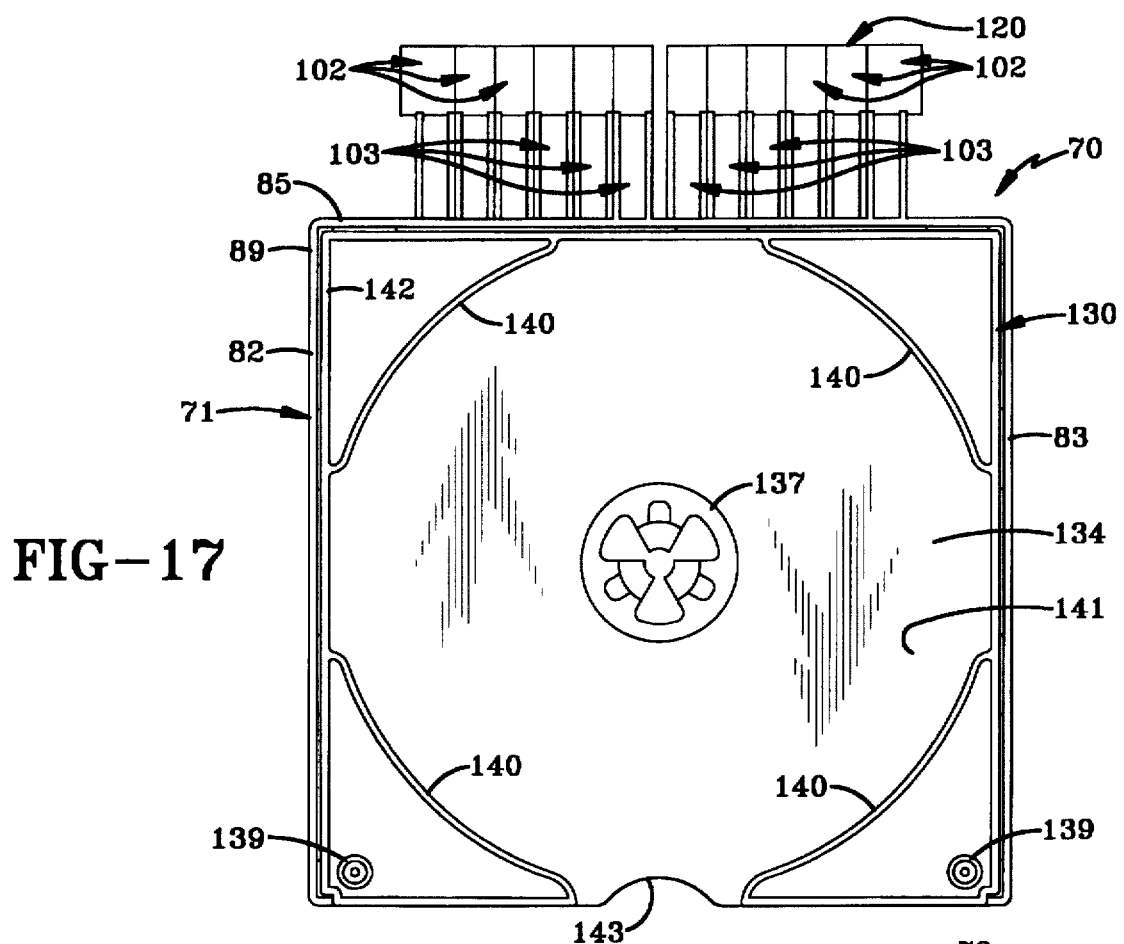
FIG. 17 is a plan view of the assembled multi-media pages.
Figure 18:
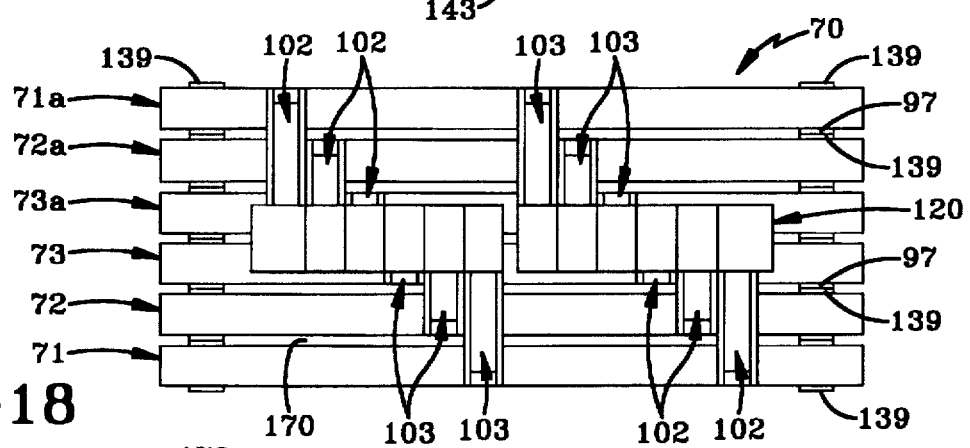
FIG. 18 is an end view of the assembled multi-media pages of FIG. 17.
Figure 19:
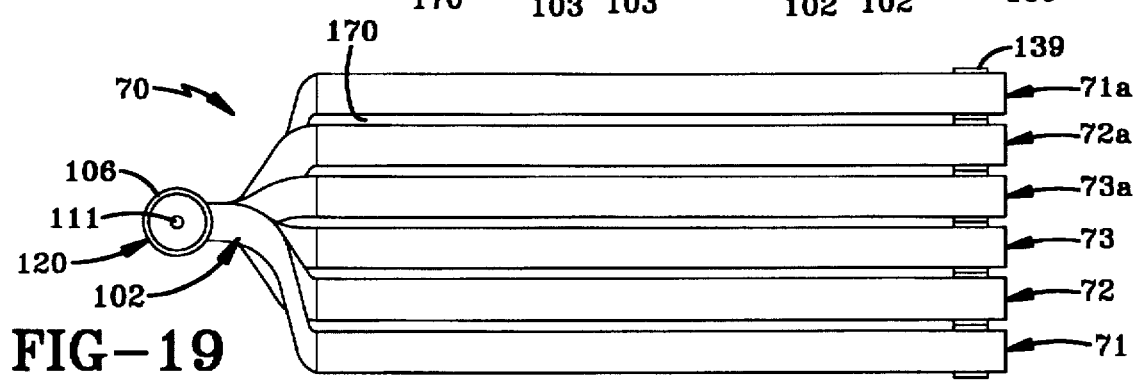
FIG. 19 is a side elevational view of the assembled multi-media pages of FIG. 17.

In accordance with one of the features of the invention, case 1 includes a page assembly, indicated generally at 70 in FIGS. 17–19 for holding recorded media and associated graphics. In the preferred embodiment, page assembly 70 includes a pair of identical outermost hinge pages 75 (FIGS. 7 and 8), a pair of identical adjacent hinge pages 76 (FIG. 9) and a pair of identical middle hinge pages 77 (FIG. 10), with each hinge page having an attachment member mounted thereon, such as a compact disc cover page 130 (FIGS. 3 and 4) or a floppy diskette cover page 132 (FIGS. 5 and 6). Cover pages 130 and 132 releasably snap-fit to hinge pages 75, 76 and 77 to form outer multi-media pages 71 and 71a, middle multi-media pages 72 and 72a, and inner multi-media pages 73 and 73a (FIGS. 18–22), respectively. Hinge pages 75–77 are rectangular-shaped (FIGS. 7–15) and are molded preferably from a plastic material, such as polypropylene.

Hinge pages 75–77 are all generally similar to one another in structure and are formed with a four-sided rectangular-shaped flat bottom wall 80 (FIGS. 7–10) having opposite parallel sides 82 and 83 and front and rear ends 84 and 85, respectively. A peripheral edge 89 extends above and below bottom wall 80 and has a curved shaped indent 94 which is formed centrally in front end 84. A plurality of slots 91 are formed in bottom wall 80 adjacent edge 89 and along sides 82 and 83 and rear end 85. Latching shoulders 92 extend upwardly from an inner surface of edge 89 and are aligned with and extend partially across slots 91. A usual hub 93 having a plurality of flexible tabs 96 is formed centrally on bottom wall 80 for insertion into a center opening 98 formed in a usual compact disc 101 (FIGS. 14, 23 and 24) for frictionally retaining the disc adjacent bottom wall 80. A hole 95 (FIGS. 7, 9 and 10) is formed in bottom wall 80 adjacent the corners between front ends 84 and each side 82 and 83 for molding a pair of bosses 97 which extend from bottom wall 80 and assist in preventing adjacent multi-media pages from contacting the compact disc held by hub 93. Four curved walls 99 extend between each side 82 and 83, and front and rear ends 84 and 85, respectively, to define the periphery of a compact disc storage area 100.

A pair of curved arms 102 and 103 extend outwardly from rear 85 of each hinge page 75–77. Arms 102 and 103 are reinforced on each side by a gusset 104 which extends vertically above and below a thin middle web section 105 and have a width A of approximately 9/32 inches (FIGS. 7, 9 and 10). A pair of annular housings 106 and 114 are formed on the ends of arms 102 and 103, respectively, and include circular open ends 108 and 108a, respectively, which face outwardly, and closed ends 110 and 110a, respectively, which face inwardly (FIGS. 9–14).

A hole 111 (FIGS. 13, 14 and 19–22) is formed centrally in closed ends 110 and 110a of housings 106 and 114, respectively. A boss 112 and 115 is formed on closed ends 110 and 110a of housings 106 and 114, respectively, of hinge pages 76 and 77. Hinge pages 75 have a boss 112 only on housing 106. Each boss 112 and 115 includes an outwardly extending arcuate tab 113. Housing 106 of outer hinge pages 75 includes an extended portion 106a (FIGS. 7 and 8) which extends outwardly beyond the outer gusset 104.

A pair of teeth 117 and 117a (FIGS. 20–22) are formed on an inner surface of housings 106 of hinge pages 76 and 77 which form multi-media pages 72 and 72a, and 73 and 73a, respectively, and a similar pair of teeth 118 and 118a are formed on an inner surface of housings 114 of hinge pages 75–77 (FIGS. 14). Teeth 117 and 117a are positioned slightly downwardly from web section 105 of arm 102 and teeth 118 and 118a are positioned slightly upwardly from web section 105 of arm 103. A gap 119 is formed between the outer surfaces of adjacent teeth to receive arcuate tab 113 when page assembly 70 is in an assembled position within case 1 (FIGS. 17–23).

The curved lengths of arms 102 and 103 differ slightly for hinge pages 75–77 (FIGS. 18 and 19), with the effective lengths thereof being equal to allow housings 106 and 114 of each page to extend to a central position of page assembly 70 and to interlock and form a hinge assembly 120 as shown in FIGS. 17–19 and as described below in further detail.

In accordance with still another feature of the invention, arms 102 of outer hinge pages 75 are positioned from sides 83 a distance E (FIG. 7) which is approximately 13/16 inches and are separated from arms 103 by a predetermined distance D (FIGS. 7–10) which is approximately 19/16 inches. Arms 102 of hinge pages 76 are positioned from sides 83 a distance F (FIG. 9) which is equal to the sum of distance E plus the width A of one of arms 102, or approximately 13/32 inches, and are separated from arms 103 by distance D. Arms 103 of hinge pages 77 (FIG. 10) are positioned from sides 83 a distance G which is equal to the sum of distance F plus the width A of one of arms 102, or approximately 13/8 inches, and are separated from arms 103 by a distance D.

When case 1 is assembled, outermost multi-media page 71 sits within base 4 and arms 102 and 103 thereof extend over hinge panel 40. Extended portion 106a of housing 106 extends into counterbore 62 of end lug 50 and closed end 110a sits adjacent the side of middle lug 52 which faces end lug 51.

Adjacent multi-media page 72 sits on top of multi-media page 71 (FIG. 19) and arms 102 and 103 of page 72 extend adjacently to arms 102 and 103, respectively, of page 71.

Boss 112 of page 71 extends into open end 108 of page 72, and boss 115 of page 72 extends into open end 108a of page 71. Holes 111 of housings 106 and 114 of multi-media pages 71 and 72 are axially aligned with one another and arcuate tabs 113 of bosses 112 and 115 extend into gaps 119 of teeth 117 and 117a of housing 106 and of teeth 118 and 118a of housing 114, respectively.

Middle multi-media page 73 sits on top of adjacent multi-media page 72 and arms 102 and 103 of page 73 extend adjacently to arms 102 and 103, respectively, of page 72. Boss 112 of page 72 extends into open end 108 of page 73 and boss 115 of page 73 extends into open end 108a of page 72. Holes 111 of housings 106 and 114 of multi-media pages 71–73 are axially aligned with one another and arcuate tabs 113 of bosses 112 and 115 extend into gaps 119 of teeth 117 and 117a of housing 106 and of teeth 118 and 118a of housing 114, respectively.

Multi-media pages 71a–73a interconnect in the same manner as multi-media pages 71–73 as described above. Multi-media page 73a is flipped upside down and positioned on top of multi-media page 73. Arms 102 and 103 of page 73a extend adjacently to arms 103 and 102, respectively, of page 73. Boss 112 of page 73 extends into open end 108a of page 73a and boss 112 of page 73a extends into open end 108a of page 73.

Multi-media page 72a is flipped upside down and positioned on top of multi-media page 73a and arms 102 and 103 of page 72a extend adjacently to arms 102 and 103, respectively, of page 73a. Boss 115 of page 73a extends into open end 108a of page 72a and boss 112 of page 72a extends into open end 108 of page 73a.

Figure 23:
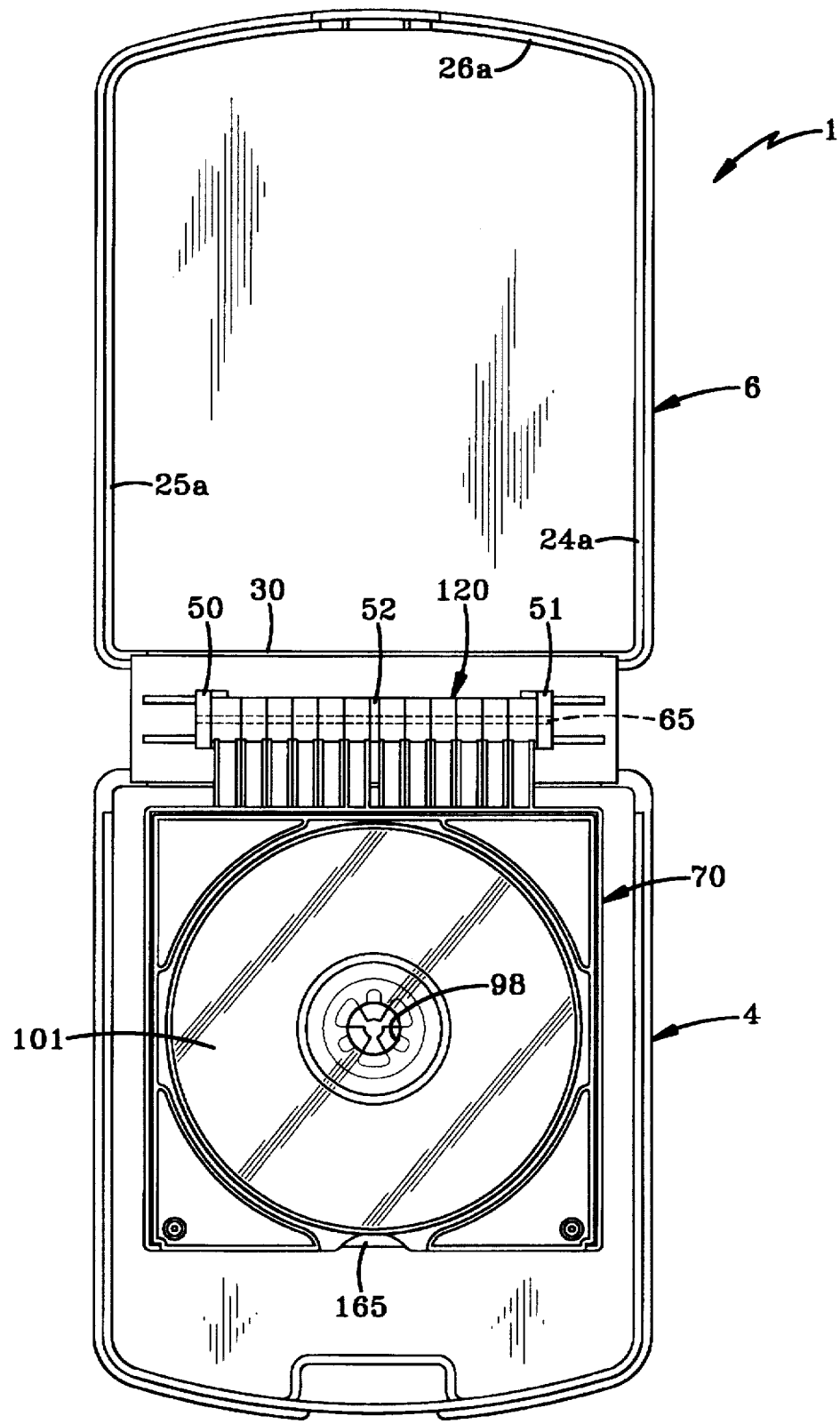
FIG. 23 is a top plan view of the case of FIG. 1 with six of the multi-media pages being mounted therein.

Outermost multi-media page 71a is flipped upside down and positioned on top of adjacent multi-media page 72a. Boss 115 of page 72a extends into open end 108a of page 71a and boss 112 of page 71a extends into open end 108 of page 72a. Extended portion 106a of page 71a extends into counterbore 62 of lug 51 and closed end 110a of housing 114 of page 71a sits adjacent the side of middle lug 52 which faces end lug 50 and is supported thereon by support flange 63. Holes 111 formed in each closed end 110 and 110a of housings 106 and 114, respectively, are axially aligned with holes 60 of lugs 50–52 and with each other to allow rod 65 to extend therethrough and secure hinge assembly 120 to hinge panel 40 (FIG. 23). It is understood that hinge assembly 120 may interlock and snap-fit within counterbores 62 of lugs 50 and 51, and be held therein, free of rod 65.

In accordance with another feature of the invention, hinge pages 75–77 are molded to receive either a compact disc cover page, shown in FIGS. 3 and 4 and indicated generally at 130, or a 3½ inch floppy diskette cover page, shown in FIGS. 5 and 6 and indicated generally at 132. Cover pages 130 and 132 sit within an area 133 (FIG. 8) which is defined by the downwardly extending portion of peripheral edge 89 of bottom wall 80 and are latched thereto as described below in further detail.

Compact disc cover page 130 (FIGS. 3 and 4) has a flat bottom wall 134 which is complementary to flat bottom wall 80 of hinge pages 75–77 and includes an upstanding peripheral edge 142. A hub 137 is formed in the center of bottom wall 134 for receiving opening 98 of another compact disc 101. A curved-shaped indent 143 is formed along a front edge of compact disc cover page 130 which aligns with indent 94 of hinge pages 75–77. Two holes 138 are formed partially through bottom wall 134 adjacent the front corners thereof for molding a pair of bosses 139 which assist in preventing adjacent multi-media pages from contacting the compact disc held by hub 137 as shown in FIGS. 18 and 19. Curved walls 140 extend between each side and the front and the rear of cover page 130 to form the periphery of a compact disc storage area 141.

Floppy diskette cover page 132 (FIGS. 5 and 6) has a generally U-shaped flat bottom wall 144 with a U-shaped opening 145 formed in the front thereof and a peripheral upstanding edge 146. An inner edge 147 of U-shaped opening 145 has a stepped shoulder which forms a pocket 148 (FIG. 15) between cover page 132 and bottom wall 80 of the hinge page. A pair of holes 150 are formed in bottom wall 144 partially therethrough and adjacent the front corners thereof for molding a pair of bosses 151 which are similar to bosses 139 of compact disc cover page 130.

Cover pages 130 and 132 include a plurality of latching tabs 155 which are angled outwardly from bottom walls 134 and 144, respectively, forming a flat shoulder 158. Tabs 155 correspond in position and extend into slots 91 of bottom wall 80 (FIGS. 13–16) of hinge pages 75–77 and shoulders 158 thereof snap-fit with shoulders 92, as shown particularly in FIG. 16, to latch cover pages 130 and 132 to hinge pages 75–77 (FIGS. 11, 12, and 14–16), and forming multi-media pages 71–73 and 71a–73a.

Compact disc cover page 130 allows multi-media pages 71–73 and 71a–73a to hold a compact disc 101 (FIG. 14) on each of hubs 93 and 137, respectively, when cover page 130 is attached to hinge pages 75–77. A first hollow storage compartment or pocket 163 (FIG. 14) is formed between bottom wall 80 of each hinge page 75–77 and bottom wall 134 of each cover page 130 to receive a graphics booklet 165 (FIG. 23) therein.

Floppy diskette cover page 132 allows multi-media pages 71–73 and 71a–73a to hold one compact disc 101 (FIG. 15) and one 3½ inch floppy diskette 168 when cover page 132 is attached to hinge pages 75–77. Diskette 168 is stored within pocket 148 and is frictionally held against bottom wall 80 of hinge pages 75–77 by inner edge 147 of U-shaped opening 145. Graphics 165 are held within a second hollow storage compartment or pocket 169 (FIG. 15) formed between bottom wall 80 of each hinge page 75–77 and the arms of U-shaped bottom wall 144 of each floppy diskette cover page 132.

Page assembly 70 is shown assembled in FIGS. 17–19 with compact disc cover pages 130 attached thereto. Bosses 97 and 139 sit adjacent to one another and form a gap 170 between adjacent multi-media. It is understood that bosses 97, 139 and 151 are optional and when hinge pages 75–77 and cover pages 130 and 132 are free of bosses 97, 139, and 151, respectively, arms 102 and 103 are molded slightly shorter in length than shown in FIGS. 17 and 19, and the peripheral edges of adjacent multi-media pages abut one another to form a gap-free page assembly 70.

Figure 24:
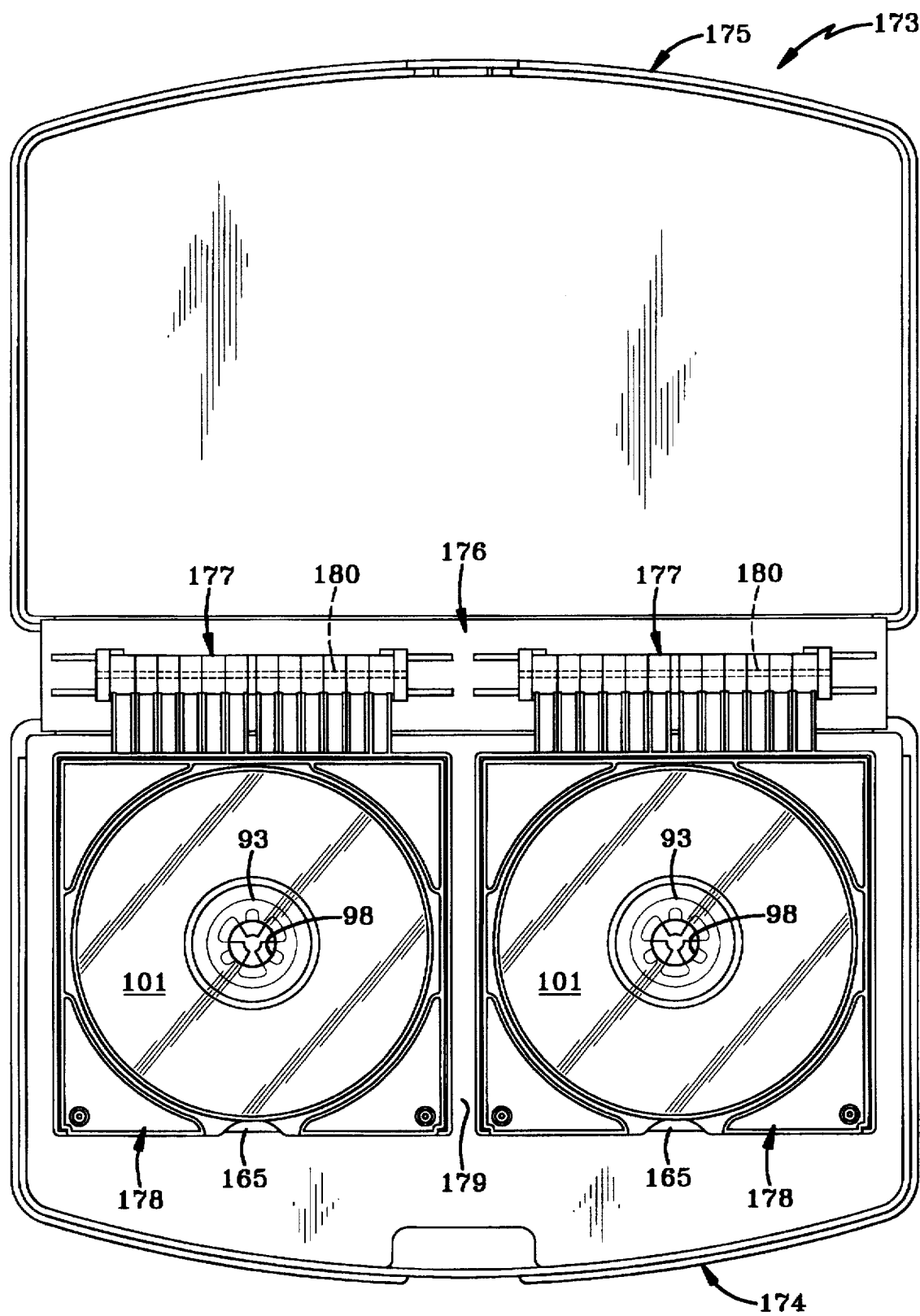
FIG. 24 is a top plan view similar to FIG. 23, of a second embodiment shown in a full open position containing twelve of the multi-media pages.

A second embodiment of the carrying case of the present invention is shown in FIG. 24 and is indicated generally at 173. Case 173 is similar to case 1 and includes a base 174 and a lid 175 connected by an elongated hinge panel 176. Hinge panel 176 supports two hinge assemblies 177 which provide pivotal movement to a pair of side-by-side page assemblies 178 which are separated by a gap 179 formed therebetween. Each page assembly 178 of case 173 is similar in structure to page assembly 70 of case 1 described above. Hinge assemblies 177 are shown held together by rods 180 but may snap-fit together without the use of such rods without affecting the concept of the invention.

Case 1 operates by manually flipping outer multi-media page 71a in the direction of arrow A, FIG. 21. Page 71a pivots until tooth 118a of page 71a abuts tab 113 of boss 115 of page 72a (not shown), and tab 113 of boss 112 of page 71a abuts tooth 117a of page 72a as shown in FIG. 21. Further pivotal movement of page 71a in the direction of arrow A (FIG. 22) causes tooth 118a of page 71a and tooth 117a of page 72a to interact with tabs 113 of page 72a and page 71a, respectively, to pivot page 72a in the direction of arrow B (FIG. 22) until page 71a is lying in a substantially horizontal position within lid 6. Page 72a is supported in the angularly vertically extending position of FIG. 22, approximately 40 to 60 degrees above page 73a, and displays the compact disc or floppy diskette stored thereon for viewing or removal thereof.

Multi-media page 72a is then manually pivoted in the direction of arrow A (FIG. 22) forcing page 73a to pivot in the direction of arrow B in the same manner described above. The multi-media pages are flipped as described above until the entire page assembly 70 sits within lid 6.

Because hinge pages 75–77 of multi-media pages 71–73 are identical to hinge pages 75–77 of multi-media pages 71a–73a, the multi-media pages can be pivoted in a direction opposite that of arrow A and subsequently flipped in the opposite direction re-displaying the compact discs or floppy diskettes in the same manner as described above, until the page assembly assumes the position of FIG. 23. Page assemblies 178 of case 173 each operate in the same manner as page assembly 70 of case 1. Indents 94 and 143 allow an edge of graphics 165 to grasped and easily removed from the hinge pages and attached cover pages (FIGS. 23 and 24).

Accordingly, cases 1 and 173 include a plurality of hinge pages 75–77 which interconnect to form hinge assemblies 120 and 177, respectively. Also, hub 93 is attached to hinge pages 75–77 for receiving compact disc 101 and for retaining the compact disc to the hinge pages. Furthermore, cover pages 130 and 132 snap-fit to hinge pages 75–77 to form multi-media pages 71–73 and 71a–73a, and retain either a second compact disc 101 or floppy diskette 168 and form hollow storage compartments or pockets 163 and 169 which store graphics 165. Additionally, arcuate tabs 113 of bosses 112 and 115 and teeth 117 and 117a, and 118 and 118a of housings 106 and 114, respectively, cooperate to flip the multi-media pages to a displayed position when an adjacent multi-media page is manually pivoted to a substantially horizontal position.

Accordingly, the improved carrying case is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved carrying case is constructed and used, the characteristics of the construction, and the advantageous, new and useful results obtained; the new and useful structures, devices, elements, arrangements, parts and combinations, are set forth in the appended claims.

We claim:

1. A carrying case for recorded media and associated graphics including:
    a base hingedly connected to a lid by a hinge panel for movement between open and closed positions;
    a plurality of pages;
    a hinge assembly for movably mounting the pages on the hinge panel;
    a hub formed on a first side of each of the pages for supporting a first recorded medium on said pages;
    an attachment member mounted on a second side of each of the pages for storing a second recorded medium on said pages; and
    said attachment member including a panel complementary in shape and size to the page and a hub for supporting the second recorded medium, and latching means for retaining the attachment member in juxtaposition to the page and for forming a storage compartment between each page and its respective attachment member for storing the graphics thereon.

2. The case defined in claim 1 in which the hinge assembly includes an arm extending from each page and a housing formed on a free end of each arm and engageable with the housing of an adjacent page for sequentially moving the pages from a first position to a second position when an adjacent page is moved to facilitate insertion and removal of the recorded media into and out of said page.

3. The case defined in claim 2 in which certain of the housings include an open first end and an opposite second end formed with an outwardly extending tab; and in which teeth are formed within the open first ends and engage the tabs of adjacent page arms for sequentially moving the pages when an adjacent page is moved.

4. The case defined in claim 3 in which the tab is arcuate shaped; in which the open first end of the arm is circular with the teeth extending radially into said open end; and in which the tab slidably moves within said open end and, upon engagement with the teeth of an adjacent arm, moves said adjacent arm and associated page.

5. The case defined in claim 2 in which there are at least three substantially similar pages, each page having a pair of spaced arms extending outwardly from a rear edge thereof; in which the spacings between the arms are substantially the same for each page; and in which the arms are positioned along said rear edge of the pages at different locations, whereby when said three pages are placed in a stacked relationship, the arms lie substantially adjacent to each other to form the hinge assembly.

6. The case defined in claim 5 in which the arms of each pair of arms of each page are similar to each other and have a curved configuration; and in which the curved length of the arms of each page is different from the curved length of the adjacent page in order to provide an equal effective arm length when the pages are placed in the stacked relationship.

7. The case defined in claim 1 in which the hinge panel includes an elongated panel connected between the base and the lid by a pair of reduced thickness living hinges.

8. The case defined in claim 7 in which a plurality of lugs extend outwardly from the hinge panel; and in which the hinge assembly is pivotally mounted on said lugs.

9. The case defined in claim 8 in which the lugs include a pair of outer lugs and an intermediate lug; and in which a curved recess is formed on an inside surface of each of said outer lugs and a curved flange is formed on at least one side of said intermediate lug.

10. The case defined in claim 1 in which each page has a rectangular-shaped substantially flat bottom wall, a peripheral edge extending about said bottom wall, and a plurality of slots formed in said bottom wall.

11. A carrying case for recorded media and associated graphics including:

a base hingedly connected to a lid by a hinge panel for movement between open and closed positions;

a plurality of pages, each having a rectangular-shaped substantially flat bottom wall, a peripheral edge extending about said bottom wall, and a plurality of slots formed in said bottom wall;

a hinge assembly for movably mounting the pages on the hinge panel;

a hub formed on a first side of each of the pages for supporting a first recorded medium on said pages;

an attachment member mounted on a second side of each of the pages for storing a second recorded medium on said pages, including latching means for retaining said attachment member to the page; and a storage compartment formed between each page and its respective attachment member for storing the graphics therein.

12. The case defined in claim 11 in which the latching means includes a plurality of latching tabs mounted on the attachment member and selectively engageable within the bottom wall slots of the page.

13. The case defined in claim 11 in which the attachment member is generally U-shaped and is formed with an opening therein and has a stepped shoulder formed about an edge of said opening for forming a pocket to receive and retain a diskette therein.

14. The case defined in claim 11 in which the attachment member includes a panel complementary in shape and size to the page; and in which a hub is formed on said attachment member panel for supporting a second recorded medium of said page.

15. A carrying case for recorded media and associated graphics including:

a base hingedly connected to a lid by a hinge panel for movement between open and closed positions, said hinge panel having an elongated panel connected between the base and the lid by a pair of reduced thickness living hinges and a plurality of lugs extending outwardly from the hinge panel, said lugs including a pair of outer lugs and an intermediate lug with a curved recess being formed on an inside surface of each of said outer lugs and a curved flange being formed on at least one side of said intermediate lug;

a plurality of pages;

a hinge assembly pivotally mounted on the hinge panel for movably mounting the pages on the hinge panel;

a hub formed on a first side of each of the pages for supporting a first recorded medium on said pages;

an attachment member mounted on a second side of each of the pages for storing a second recorded medium on said pages; and a storage compartment formed between each page and its respective attachment member for storing the graphics therein.

16. A carrying case for recorded media and associated graphics including:

a base hingedly connected to a lid by a hinge panel for movement between open and closed positions;

a plurality of pages;

a hinge assembly for movably mounting the pages on the hinge panel, said hinge assembly including an arm extending from each page and a housing formed on a free end of each arm and engageable with the housing of an adjacent page for sequentially moving the pages from a first position to a second position when an adjacent page is moved to facilitate insertion and removal of the recorded media into and out of said page, wherein certain of the housings include an open first end and an opposite second end formed with an outwardly extending tab, and teeth formed within the open first ends and engageable with the tabs of adjacent page arms for sequentially moving the pages when an adjacent page is moved;

a hub formed on a first side of each of the pages for supporting a first recorded medium on said pages;

an attachment member mounted on a second side of each of the pages for storing a second recorded medium on said pages; and a storage compartment formed between each page and its respective attachment member for storing the graphics therein.

17. A carrying case for recorded media and associated graphics including:

a base hingedly connected to a lid by a hinge panel for movement between open and closed positions;

a plurality of pages;

a hinge assembly for movably mounting the pages on the hinge panel, said hinge assembly including an arm extending from each page and hinge means formed on a free end of each arm for moving the pages when an adjacent page is moved, said hinge means interconnecting with the hinge means of adjacent pages to form the hinge assembly, said hinge means being formed with a closed end, an open end and a cylindrical side wall, a boss extending outwardly from the closed end and at least one tooth extending from an inner surface of the cylindrical side wall and interacting with the boss to move the pages;

a hub formed on a first side of each of the pages for supporting a first recorded medium on said pages;

an attachment member mounted on a second side of each of the pages for storing a second recorded medium on said pages; and a storage compartment formed between each page and its respective attachment member for storing the graphics therein.

\* \* \* \* \*